(12) United States Patent
Baeten et al.

(10) Patent No.: US 11,590,517 B2
(45) Date of Patent: Feb. 28, 2023

(54) UNIVERSAL MINIMAL WASTE DISPENSING TIP

(71) Applicant: Inter-Med, Inc., Racine, WI (US)

(72) Inventors: John Baeten, Muskego, WI (US); Alexander D. Johnson, Mount Pleasant, WI (US)

(73) Assignee: INTER-MED, INC., Racine, WI (US)

( * ) Notice: Subject to any disclaimer, the term of this patent is extended or adjusted under 35 U.S.C. 154(b) by 0 days.

(21) Appl. No.: 17/929,187

(22) Filed: Sep. 1, 2022

(65) Prior Publication Data

US 2022/0410184 A1 Dec. 29, 2022

Related U.S. Application Data

(63) Continuation of application No. 16/689,837, filed on Nov. 20, 2019, which is a continuation of application No. 29/692,825, filed on May 29, 2019, now Pat. No. Des. 958,929.

(60) Provisional application No. 62/770,464, filed on Nov. 21, 2018.

(51) Int. Cl.
  *B05B 1/10* (2006.01)
  *B65D 83/00* (2006.01)

(52) U.S. Cl.
  CPC ............ *B05B 1/10* (2013.01); *B65D 83/0022* (2013.01)

(58) Field of Classification Search
  CPC .............................. B05B 1/10; B65D 83/0022
  See application file for complete search history.

(56) References Cited

U.S. PATENT DOCUMENTS

| 600,803 A | * | 3/1898 | Robinson ................ A61M 5/24 |
| | | | 604/218 |
| 2,029,483 A | | 2/1936 | Holland |
| (Continued) | | | |

FOREIGN PATENT DOCUMENTS

| EP | 2688606 B1 | * | 5/2018 | ............. A61C 5/062 |
| EP | 2688606 B1 | | 5/2018 | |

OTHER PUBLICATIONS

*Is EndoSequence BC Sealer Expensive?* (*Friday Questions*), Allen Ali Nasseh, Undated; viewed Nov. 11, 2019, pp. 1 thr 4 (https://realworldendo.com/).

(Continued)

*Primary Examiner* — Bob Zadeh
(74) *Attorney, Agent, or Firm* — Barnes & Thornburg LLP; Ryan L. Marshall

(57) ABSTRACT

An applicator for a syringe is provided that includes a hub configured to be disposed at least partially within a nozzle of the syringe and defining a fluid passage therethrough, with one or barbs on the hub that frictionally and sealingly engage an interior of the nozzle in a manner minimizing void space associated with waste of deliverable material, and an applicator tip extending distally from the hub. The barb(s) may have varying diameters in order to enable the applicator to be engaged and utilized with syringes having different diameter nozzles. Further the fluid passage through the hub and applicator tip is dimensioned to minimize the volume of material that is retained within the applicator after use, thereby increasing the volume of material that can dispensed from the syringe for use in a procedure or procedures and minimize waste.

20 Claims, 13 Drawing Sheets

(56) References Cited

U.S. PATENT DOCUMENTS

| | | | | |
|---|---|---|---|---|
| 2,664,893 | A | * | 1/1954 | Kempel .............. A61M 3/0262 206/229 |
| 3,294,089 | A | | 12/1966 | Brookfield |
| 3,754,553 | A | * | 8/1973 | Hewitt ................ A61M 3/0262 604/212 |
| 3,773,047 | A | | 11/1973 | Sneider |
| 4,274,555 | A | * | 6/1981 | Sneider .............. A61M 3/0262 222/107 |
| 4,392,617 | A | | 7/1983 | Bakos |
| D326,273 | S | | 5/1992 | Nakao |
| D366,051 | S | | 1/1996 | Lewis |
| 5,820,606 | A | | 10/1998 | Davis |
| 5,853,373 | A | | 12/1998 | Griffith |
| 6,095,813 | A | * | 8/2000 | Broyles .................... A61C 5/62 604/218 |
| 6,113,572 | A | | 9/2000 | Gailey |
| D433,692 | S | | 11/2000 | Fort |
| D434,053 | S | | 11/2000 | Fort |
| 6,537,239 | B2 | | 3/2003 | Mark |
| 7,128,283 | B1 | | 10/2006 | Shahin |
| D636,844 | S | | 4/2011 | Herre |
| 8,079,534 | B2 | | 12/2011 | Fecht |
| D717,396 | S | | 11/2014 | Hammarback |
| D749,693 | S | | 2/2016 | Evans |
| D752,177 | S | | 3/2016 | Enomoto |
| D806,831 | S | | 1/2018 | Zou |
| D846,070 | S | | 4/2019 | Zou |
| D900,277 | S | | 10/2020 | Albino |
| D926,922 | S | | 8/2021 | Arenson |
| D926,923 | S | | 8/2021 | Ross |
| D933,160 | S | | 10/2021 | Ross |
| D934,991 | S | | 11/2021 | Amano |
| D943,061 | S | | 2/2022 | McIntyre, II |
| D943,708 | S | | 2/2022 | Eshelman |
| D946,696 | S | | 3/2022 | Swiatek |
| 11,313,501 | B2 | | 4/2022 | Chen |
| D958,929 | S | | 7/2022 | Baeten |
| 2004/0051303 | A1 | | 3/2004 | Lorenz |
| 2004/0055254 | A1 | | 3/2004 | Setton |
| 2004/0102738 | A1 | * | 5/2004 | Dikeman .............. A61M 39/24 604/256 |
| 2004/0138642 | A1 | | 7/2004 | Fischer |
| 2010/0240004 | A1 | * | 9/2010 | Zalsman .................. A61C 5/68 433/90 |
| 2010/0261138 | A1 | | 10/2010 | Ho |
| 2012/0255890 | A1 | | 10/2012 | Cumberland |
| 2012/0258423 | A1 | | 10/2012 | Dubey |
| 2013/0140225 | A1 | | 6/2013 | Decock |
| 2015/0034114 | A1 | | 2/2015 | Miles |
| 2015/0202637 | A1 | | 7/2015 | Nikles |
| 2016/0008545 | A1 | | 1/2016 | Brothers |
| 2020/0156086 | A1 | | 5/2020 | Baeten |
| 2022/0040712 | A1 | | 2/2022 | Erickson |
| 2022/0040713 | A1 | | 2/2022 | Mock |
| 2022/0065374 | A1 | | 3/2022 | Xie |
| 2022/0072567 | A1 | | 3/2022 | Kuo |

OTHER PUBLICATIONS

Brasseler USA brochure; BC Sealer™; dated Oct. 2019; 1 pg.

*Scott's Dental Supply—Visco-Tip*; Undated; viewed Nov. 20, 2019; pp. 1-2; (https://www.scottsdental.com/visco-tip.html).

Syringe Adaptor/Coupler—Luer Lock, Oct. 30, 2019, amazon.ca, Mar. 2, 2022, URL: https://www.amazon.ca/Syringe-Adaptor-Coupler-Polypropylene-Transfer/dp/B01KY6X6CS/ (Year: 2019).

Premium Quality Quick Connect Connectors & Adopters Set of 5 Pcs—1, Jul. 14, 2015, amazon.ca, Mar. 2, 2022,URL: https://www.amazon.ca/Premium-Quality-Connect-Connectors-Adopters/dp/B0745VSW12/ (Year: 2015).

Litorange 2 PCS Lead-Free Brass Winterize Sprinkler Systems: Air Compressor 1/4" Quick Connect Plug, Jan. 30, 2019, amazon.ca, Mar. 20, 2022, URL: https://www.amazon.ca/dp/B07KWZHM8B/ (Year: 2019).

Iwata-Medea—Kustom Fluid Nozzle 0.5Mm, May 18, 2016, amazon.ca, May 20, 2022, URL: https://www.amazon.ca/Iwata-Medea-Iwata-Nozzle-Hp-Th/dp/B00A6WFIUY/ (Year: 2016).

\* cited by examiner

UNIVERSAL MINIMAL WASTE DISPENSING TIP

CROSS-REFERENCE TO RELATED APPLICATIONS

This application is a continuation of U.S. application Ser. No. 16/689,837, filed Nov. 20, 2019, which is a non-provisional application which claims priority to U.S. provisional application Ser. No. 62/770,464, filed Nov. 21, 2018 and under 35 USC § 120 to U.S. application Ser. No. 29/692,825, filed May 29, 2019, each of which is incorporated by reference herein in its entirety.

TECHNICAL FIELD

The presently disclosed embodiments relate generally to syringes and more specifically to a dispensing applicator or applicator tip that is attachable to the syringe in order to direct material dispensed from the syringe with decreased or minimized waste and/or material-retention.

BACKGROUND

In various types of medical and dental procedures it is often necessary for an individual to dispense an amount of a fluid onto a surface being treated. The fluids can have various purposes, such as to sterilize, anesthetize, clean or treat in some manner the surface being examined during the procedure.

In order to precisely deliver the fluids onto the surface for the desired purpose, a number of different delivery systems have been developed. One such delivery system is a syringe. The syringe is formed with a barrel containing an amount of the fluid to be dispensed and a nozzle at one end of the barrel from which the fluid is expelled from the barrel. Opposite the nozzle, a plunger is slidably positioned within the barrel and includes a bung that contacts the fluid within the barrel. The plunger can be moved within the barrel in order to compress the fluid via the bung to urge or force the fluid from within the barrel out of the syringe through the nozzle. The amount of fluid dispensed from the nozzle is controlled by the force applied to the fluid via the plunger, and thus the individual can determine the amount of fluid to be dispensed.

With these syringes, a suitable applicator, such as a those including a needle extending outwardly from a plastic assemblage, among others, is secured to the nozzle opposite the barrel to direct the flow of fluid from the nozzle and inject or apply various medical materials and medicaments. To secure the applicator to the nozzle, a suitable engagement structure is formed on the nozzle that is engageable with a complementary structure disposed on the applicator. Typically these "applicators" are called "applicator tips" (these words are used interchangeably throughout the document).

By far the most common syringe and applicator connection is formed by the luer taper in which the syringe nozzle is formed with a 6% tapered surface on the exterior of the nozzle tip that allows for a fluid tight connection when mated with an applicator that has an assemblage with an interior surface having a complementary 6% taper. The assemblage also includes an engagement structure, to facilitate a lock or a slip connection with the nozzle. In the luer lock connection, an exterior flange on the assemblage is engaged with threads located on the exterior of the nozzle or on the interior surface of a sheath spaced from and surrounding the nozzle. In the luer slip connection, the friction between the interior 6% taper surface of the assemblage and the exterior 6% taper surface of the nozzle hold the applicator on the nozzle, optionally in conjunction with a locking member on the assemblage that engages the nozzle.

As shown in FIG. 1, the current construction of a currently-available tip/hub 17 forming the part of the applicator that is used to connect the applicator to a syringe 15 is configured to fit over and around the distal tip/nozzle 15x of the syringe at its distal end and results in a significant amount of unintended waste of the material to be dispensed from the syringe. Although the entire syringe barrel is not expressly illustrated in this prior art drawing, those of skill in the art will readily appreciate how the hub 17 fits with the distal tip/nozzle 15x of a standard syringe 15 that includes a distal-extending lip 15y around that tip 15x. More specifically, the portion of the hub of the applicator that extends between the distal terminus of a syringe nozzle 17a and a proximal end 17c of a needle as indicated in FIG. 1 essentially functions as a reservoir 17b for unused material within the applicator. When the syringe's plunger 15w is pressed completely into the barrel of the syringe 15, any material to be dispensed from the barrel is urged out to and through the applicator 17. However, because the material exiting the needle must be acted upon by additional material positioned between the needle and the plunger and being pressed by the plunger, when the plunger has reached the limit of its movement within the barrel, the material remaining in the hub (between the plunger 15w and proximal needle end 17c) cannot be pressed out through the needle, and thus is wasted. Although the actual volume of the material remaining unused in the hub is relatively small, in numerous procedures where a single syringe is used repetitively to dispense the material through a number of successively applied applicators, this can result in a significant amount of material wasted. As an example, dental practitioners will typically use 35 mg of a bioceramic, such as BC sealer, available from Brasseler (Savannah, Ga.), to fill voids during an endodontic procedure and/or an apicoectomy surgical procedure. The barrel of the syringe of the BC sealer contains 2 g of bioceramic, which directly translates to 57 procedures that can theoretically be performed using the amount of bioceramic contained within the syringe. However, this analysis does not take into consideration the amount of material wasted within each applicator, which is replaced for each procedure for obvious hygienic and other purposes, although the syringe is able to be used across multiple procedures. Nevertheless, testing on syringes including these amounts of material and using conventional applicators having the hubs shown in FIG. 1 have shown that approximately 82 mg of material remains unused within the hub per procedure, thereby limiting the dental practitioner to 17 actual procedures per syringe. Compared to the amount of material actually used in a typical procedure (i.e., 35 mg), 2.3× that amount of material is left unusable within the applicator. For every one procedure performed, therefore, the dental professional wastes 2.3 procedures within each applicator with a cost in price and materials associated with losing about 40 procedures.

One prior art attempt to address this issue is disclosed in U.S. Patent Application Publication No. US2016/0008545, entitled Low Waste Syringe And Needle Assemblage, the entirety of which is expressly incorporated herein by reference except that terms defined herein shall weigh over any definitions in said reference. In the '545 application, the low waste needle syringe includes a syringe tip that is formed with an outward taper of its inner diameter in order to mate with a complementary frusto-conical member of a needle assembly. The smooth outer surface of the frusto-conical member contacts the smooth inner surface of the tip to align a needle base with the exterior of the tip. The base includes threads that engage a flange on the exterior of the tip in a manner to secure the base to the syringe tip. While reducing the volume of interior of the needle assembly, and thus reducing the amount of unused material remaining within the needle assembly after use, the structure of the needle assembly requires a specific configuration for the tip that differs significantly from existing syringe configurations, as it requires the syringe to include a mating/reverse frusto-conical shape to receive and contactingly mate with the '545 publication's tip. As such, the needle assembly disclosed therein needs a custom/complementary syringe design that does not encompass the vast majority of existing commercially available syringe designs.

Accordingly, it is desirable to develop an applicator for attachment to common/commercially available syringes, which applicator is configured for significantly reducing the amount of unused material retained within the applicator after use. It is also desirable that the applicator include a universal connector that can be utilized with syringes having different nozzle or syringe tip configurations.

BRIEF SUMMARY DESCRIPTION

There is a need or desire for an applicator that reduces the amount of unused material retained within the applicator after a use that may be one of a plurality of use instances of a syringe with applicators being exchanged for each use, and that can be securely engaged with conventional syringes selected from multiple possible nozzle or syringe tip configurations, and/or with other material-delivery products (e.g., bottles, mixing applicator tips, plastic delivery/applicator tips, metal delivery/applicator tips, or others).

According to one exemplary non-limiting aspect, a universal applicator includes a hub that is engaged with the nozzle or tip of a syringe and an applicator tip that extends outwardly from the hub. The hub and applicator tip define a passage within the applicator through which material can flow to be dispensed from the applicator.

The hub includes a main body from which the applicator tip extends. The main body has a diameter greater than the diameter of a corresponding nozzle or syringe tip, and includes a neck extending outwardly from the hub opposite the applicator tip. The neck has a first section disposed immediately adjacent the hub and having a diameter less than that of the main body. The neck also optionally includes a second section extending outwardly form the first section opposite the main body, the second section having a diameter less than that of the first section. Each of the first and second sections includes an engagement structure disposed on the exterior of the first and second section. The engagement structure can frictionally engage the interior surface of a nozzle or syringe tip in order to secure the applicator to the nozzle or syringe tip to enable fluids to be dispensed from the syringe and through the applicator.

According to one exemplary, non-limiting embodiment, an applicator is configured to be secured to a syringe, where the applicator includes a hub defining a fluid passage therethrough and including at least one barb thereon, the barb configured to frictionally engage an interior of a syringe nozzle, and an applicator tip extending outwardly from the hub, where said barb will be understood to include one or more protrusions, including a frustoconical structure that protrudes around a proximal portion of the applicator.

According to another exemplary non-limiting embodiment, a syringe includes a barrel configured to hold an amount of material therein, the barrel defining an open end and a nozzle opposite the open end; a plunger disposed at least partially within the open end and including a bung sealingly engaged between the plunger and the barrel; and an applicator including a hub disposed at least partially within the nozzle and defining a fluid passage therethrough, the hub having at least one barb thereon, that frictionally and sealingly engages an interior of the nozzle, and an applicator tip extending outwardly from the hub.

According to still a further aspect of one exemplary non-limiting embodiment, a method of dispensing a fluid from a syringe includes the steps of providing a syringe comprising a barrel including an amount of fluid therein, the barrel defining an open end and a nozzle opposite the open end, a plunger disposed at least partially within the open end and including a body and a push pin extending from one end of the body, a seal plate slidably mounted to the push pin and a bung disposed over the seal plate and the push pin, the bung contacting the fluid and sealingly engaged between the seal plate and the barrel, applying a force to the plunger to press the push pin through the seal plate and against the bung to dispense the fluid from the nozzle and removing the force on the plunger to cease dispensing the fluid from the nozzle. And according to yet a further aspect of one exemplary non-limiting embodiment, a method of dispensing a fluid from a syringe includes steps of applying a force to an applicator to insert a hub at least partially into an interior of a nozzle of a syringe to frictionally and sealingly engage at least one barb of the hub with the interior of the nozzle; and applying a force on a syringe plunger to urge the plunger into a syringe barrel and to dispense a material through the nozzle and through the applicator mounted to the nozzle.

According to another non-limiting aspect of the present disclosure, some embodiments accomplish the need or desire of providing for material waste reduction with a tip universally connectable to standardly-available (e.g., compliant with ISO 594-1 and/or 594-2 standards) syringes by describing an applicator tip that utilizes at least one frusto-conical-shape within the applicator tip's hub to frictionally mate with the inner diameter of the nozzle of conventional syringes. As such, the term "universal" refers to the fact that the presently disclosed embodiments are constructed to connect with standard and readily-available syringes in a secure manner that will markedly reduce material-usage waste in comparison with other applicator tips that are presently known. In particular aspects of certain embodiment, at least one frustoconical-shape within the applicator tip's hub is disposed directly adjacent to a cylinder of reduced diameter to form at least one barb shape, where the cylinder and frustoconical or non-frustoconical protruding barb element together form a neck immediately adjacent to a larger diameter hub body. Ideally, the applicator tip's hub contains wings or ridges to facilitate mating of the tip with the syringe by providing gripping surface(s) for a user. The applicator tip's hub may snap into the inside of a syringe nozzle and rely on a friction fit between at least one barb (frustoconical) shape of the applicator tip's hub and the inner diameter of the syringe nozzle. Additionally, the applicator tip's hub may also include a luer lock connection as described in greater detail below to offer an even more secure fitment between the applicator tip and syringe. The applicator tip also includes an applicator end that can be of various materials and sizes for various clinical uses and applications, although sizes of the applicator end may often be between 16 ga and 33 ga. Further, the applicator tip is constructed to include a fluid communication pathway throughout its length such that material is expelled from the syringe through the at least one barb/frustoconical shapes, through the applicator end, and then out of the distal-most terminal tip of the applicator.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The drawings illustrate non-limiting examples of embodiments presently contemplated for carrying out the disclosure. In the drawings.

DETAILED DESCRIPTION

Figure 1:
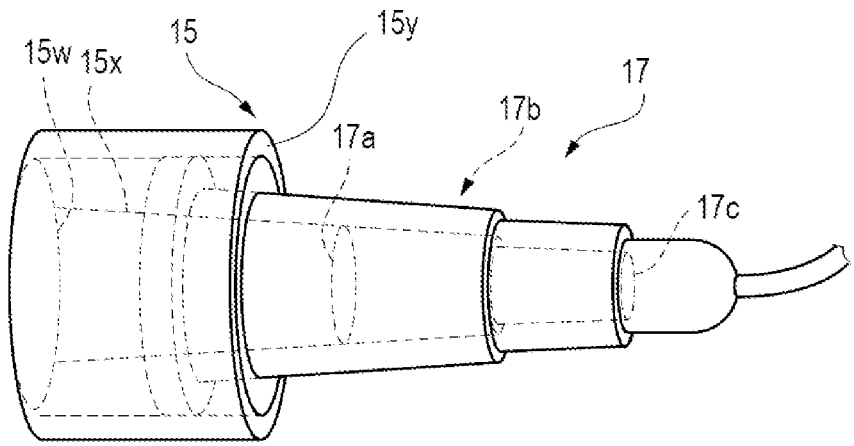
FIG. 1 is a perspective view of a prior art luer taper applicator.

Various embodiments are described below with reference to the drawings in which like elements generally are referred to by like numerals. The relationship and functioning of the various elements of the embodiments may better be understood by reference to the following detailed description. However, embodiments are not limited to those illustrated in the drawings, and it is to be understood that other embodiments may be utilized and that logical, mechanical, electrical, and other changes may be made without departing from the scope of the embodiments. It should be understood that the drawings may be, but are not necessarily to scale, and in certain instances details may have been omitted that are not necessary for an understanding of embodiments disclosed herein, such as—for example—conventional fabrication and assembly. The following detailed description is, therefore, not to be taken in a limiting sense unless expressly stated to be so, including with reference to scale/proportions of drawing figures.

The invention is defined by the claims, may be embodied in many different forms, and should not be construed as limited to the embodiments set forth herein; rather, these embodiments are provided so that this disclosure will be thorough and complete, and will fully convey enabling disclosure to those skilled in the art. As used in this specification and the claims, the singular forms "a," "an," and "the" include plural referents unless the context clearly dictates otherwise. Reference herein to any industry standards (e.g., ASTM, ANSI, IEEE, ISO, and/or other published standards) is defined as complying with the currently published standards as of the original filing date of this disclosure concerning the units, measurements, proportions, materials, and other testing criteria communicated by those standards unless expressly otherwise defined herein. The terms "proximal" and "distal" are used herein in the common usage sense where they refer respectively to a handle/doctor-end of a device or related object and a tool/patient-end of a device or related object. The terms "about," "substantially," "generally," and other terms of degree, when used with reference to any volume, dimension, proportion, or other quantitative or qualitative value, are intended to communicate a definite and identifiable value within the standard parameters that would be understood by one of skill in the art (equivalent to a medical device engineer with experience in this field), and should be interpreted to include at least any legal equivalents, minor but functionally-insignificant variants, standard manufacturing tolerances, and including at least mathematically significant figures (although not required to be as broad as the largest range thereof).

Figure 2:
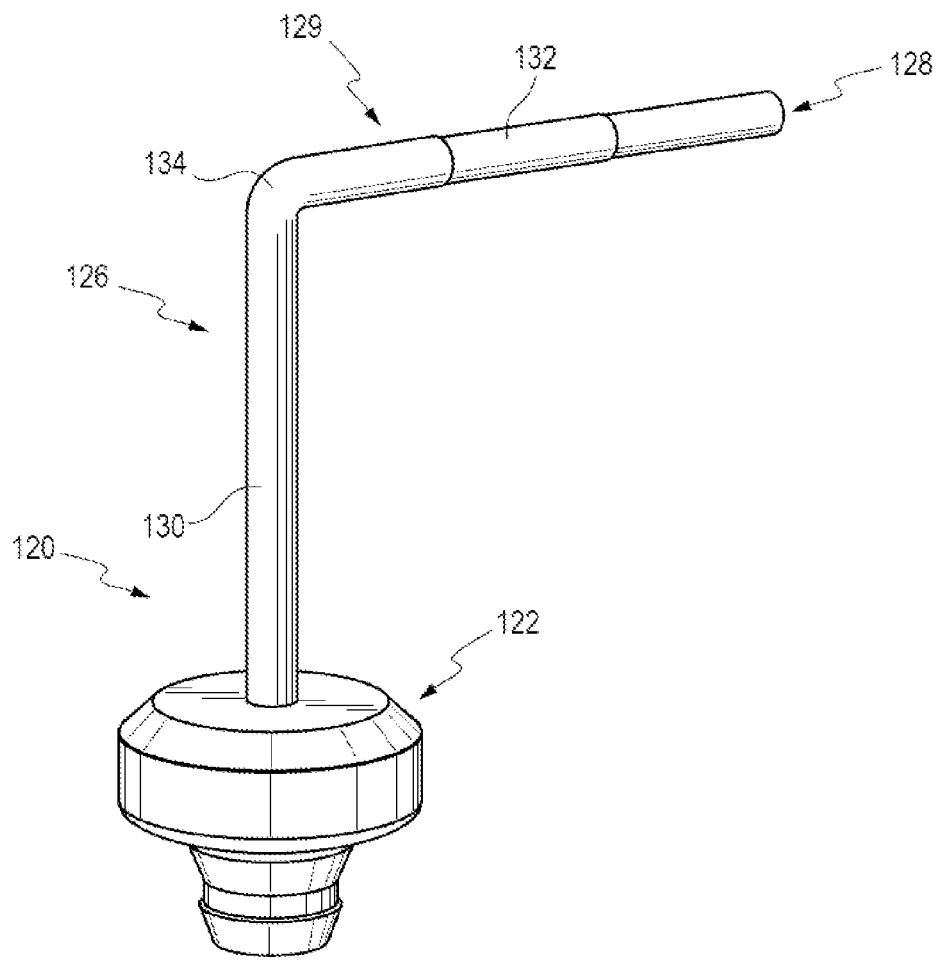
FIG. 2 is a perspective view of an applicator according one exemplary and non-limiting embodiment.

Referring to FIG. 2, one exemplary non-limiting embodiment of an applicator 120 includes hub 122 configured for connection to a syringe 20 (see, e.g., FIG. 7) and an applicator tip 126 that extends outwardly from the hub 122.

Figure 10:
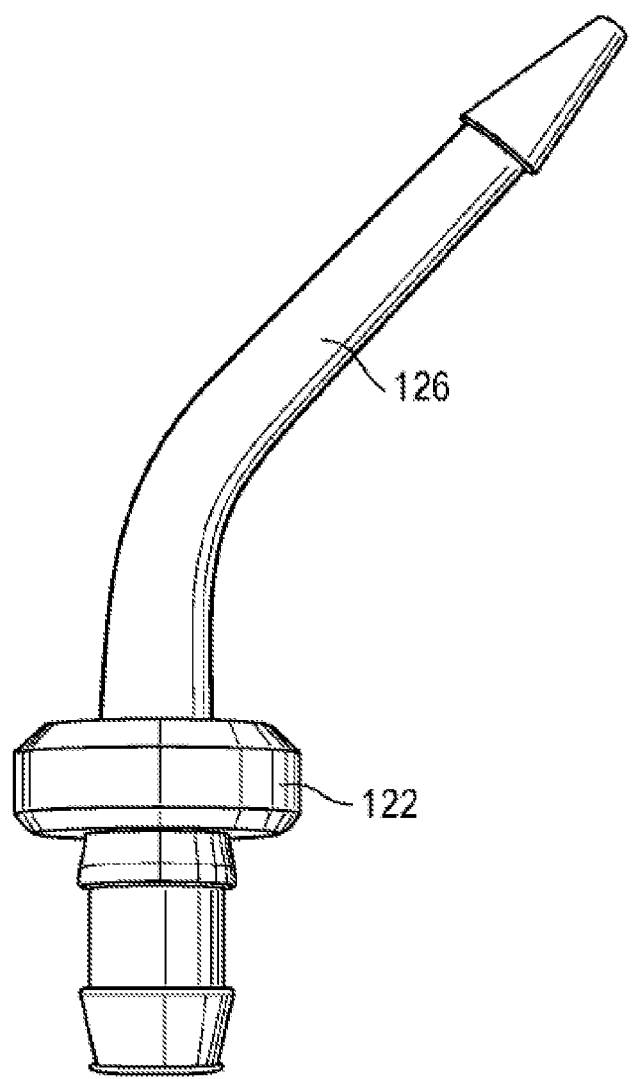
FIG. 10 shows an illustrative example of a non-limiting embodiment where the entire applicator (i.e. hub and applicator tip) is molded as one part.
Figure 11A:
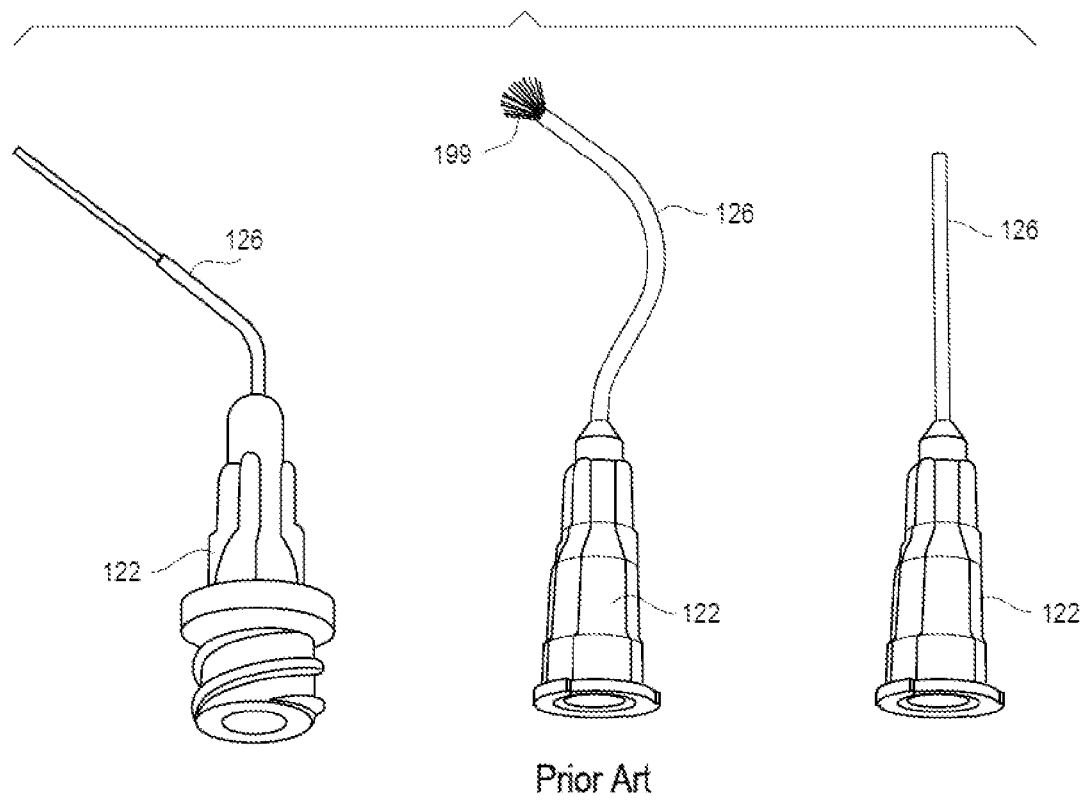
FIGS. 11A-11B show, respectively, illustrative examples of various conventional applicators and various non-limiting embodiments. Here, the applicator tip portions of the devices are identical and the hub portion is either conventional (FIG. 11A) or a non-limiting illustrative embodiment of the inventive hub (FIG. 11B). The applicator tip is bonded to the hub via adhesive or other bonding means in either case, or in some embodiments the applicator tip and hub can be injection molded as one piece.
Figure 11B:
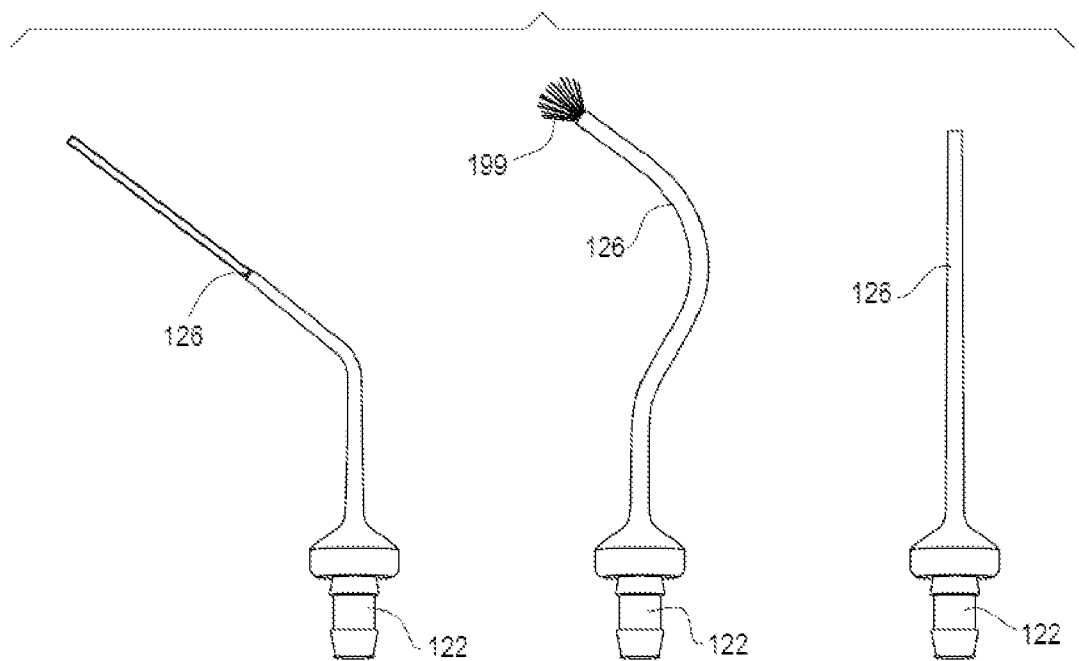

The applicator tip 126 is formed to be hollow or tubular in shape and provides the directional outlet for a fluid or material to be dispensed from the syringe 20 through the applicator 120. The tip 126 defines a material passage 128 that extends the length of the tip 126 and hub 122 through which the material dispensed from the syringe 20 can flow. The tip 126 may be constructed in a variety of styles, configurations, or designs that vary depending upon the desired use for the applicator tip 126 and/or the type of material to be dispensed form the tip 126, non-limiting examples of which are shown in FIGS. 11A-11B. In certain exemplary and non-limiting embodiments (see, e.g., FIG. 10), the tip 126 can be formed as a unitary molded piece that is integrally formed with the hub 122, or a separate type of tubing formed from a suitable plastic or metal, optionally in conjunction with synthetic or naturally occurring fibers, e.g.

a flocked fiber or brush component 199 (not shown here, but see the center embodiment of FIGS. 11A-11B), which is secured in a suitable manner as a terminal member to the end of the tip 126 opposite the hub 122. Tip 126 can also include other terminal members or structures, such as a pad (not shown) formed of a suitable material and affixed to the tip 126 via established means or methods such as adhesives, epoxies, ultrasonic bonding, or others.

In the exemplary and non-limiting embodiment of FIG. 2, the tip 126 is formed as a tube 129 defining the passage 128 therethrough and having a lower portion 130 connected in axial alignment with the hub 122 and an upper portion 132 connected to and extending outwardly from the lower portion 130 opposite the hub 122 by a bend 134. The lower portion 130 has a consistent diameter along its entire length while the upper section 132 narrows in diameter from the bend to the outlet 136 via a taper or step. Alternatively, the upper section 132 can maintain its diameter from the bend 134 to the passage 128. In some embodiments, the tip 120 is molded as a single piece and bent via a post-processing step to a desired arc or bend 134.

Looking now at FIGS. 2-6, the hub 122 of the applicator 120 is illustrated as being formed of a material similar to that used to form the tip 126, such as a suitable plastic material. The material used to form the hub 122 includes an inherent resiliency to the material, such that the material can be flexed when compressed without breaking and then can partially or fully return to its original shape when the compression is removed. Certain suitable materials for the hub 122 that include this property include, but are not limited to, polyethylene, polypropylene, or nylon, and other compressible materials of such durometer and resilience that those of skill in the art will appreciate the structural and functional appropriateness for the presently disclosed embodiments. The properties of these materials also enable the hub 122 to be formed from the material in a variety of suitable molding processes, such as injection molding processes, among others. The particular molding process for forming the hub 122 can additionally be utilized to form an applicator tip 126 integrally with a hub 122, when desired.

In the illustrated exemplary and non-limiting embodiment, the hub 122 is formed with a main body 138 and a neck 140 extending in axial alignment outwardly from the main body 138 opposite the tip 126. The main body 138 is generally cylindrical in shape, though other cross-sectional shapes can also be employed, and includes an upper surface 144, a lower surface 146 and a side wall 148 extending between the upper surface 144 and lower surface 146. The side wall 148 is joined to the upper surface 144 by a first beveled surface 150 and to the lower surface 146 by a second beveled surface 152. However, the first beveled surface 150 and second beveled surface 152 may optionally be removed. The upper surface 144 includes an aperture 154 that communicates with a passage 156 extending through the main body 138. Opposite the aperture 154, the passage 156 terminates in an opening 158 formed in the lower surface 146. In one exemplary embodiment, the passage 156 tapers as it extends through the main body 138 from the opening 158 to the aperture 154, which can be formed as desired, such as with a smoothly tapering inner surface or, as in the exemplary and non-limiting illustrated embodiment with a number of successively narrowing concentric passage sections 160,162,164. Alternatively, in another embodiment, the passage 156 can be a cylinder of constant diameter from the aperture 154 through the main body 138 and neck 140.

Figure 12:
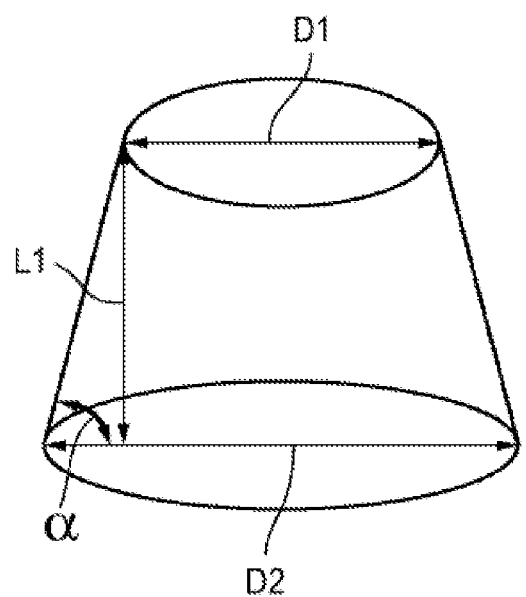
FIG. 12 shows a diagrammatic barb as a frustoconical element.

The hub 122 also includes the neck 140, which is disposed on the lower surface around the opening 158. The neck 140 includes a first section 166 disposed on the lower surface 146 around the opening 158 and a second section 168 located on the first section 166 opposite the lower surface 146. The first section 166 includes a cylindrical portion 170 extending outwardly from the lower surface 146 and a sloped portion 172 disposed on the cylindrical portion 170 opposite the lower surface 146. The cylindrical portion 170 has a constant diameter along its length, which can be between 1.5 mm and 3.5 mm, yet may be between 2.2 mm and 2.7 mm, and in one exemplary embodiment is 2.45 mm, while the sloped portion 172 has diameter larger than the cylindrical portion 170 at one end 174 immediately adjacent the cylindrical portion 170, which can be between 4.0 mm and 3.6 mm, may be between 3.1 mm and 2.4 mm, and in one exemplary embodiment is 2.6 mm, and a diameter smaller than the cylindrical portion 170 at its opposite end 176, which can be between 1.0 mm and 1.6 mm, may be between 1.8 and 2.3 mm, and in one exemplary embodiment is 2.1 mm. The end 174 having the larger diameter has a surface that is sloped out and forms a barb 178 that can be compressed to frictionally engage a surface against which the barb 178 is pressed. In view of FIGS. 2, 5, and 6, it will be understood that the barbs 178, 188 are illustrated as being formed by frustoconical structures that encircle and may be coaxial with the central passage 156, but it should be appreciated that other frustoconical engagement structures as well as non-frustoconical barbed structures may be used for the engagement and securement described with reference to those barbs 178, 188, including constructed for force-fit engagement and/or for edge-grip engagement. By way of further illustration, FIG. 12 diagrammatically illustrates an isolated barb as a frustoconical shape containing a circle of diameter D1, a circle of diameter D2, and a length, L1, between the circles that define upper and lower boundaries of the frustoconical shape. Therefore, the defined taper percentage of a frustoconical shape is calculated as follows: Taper percentage=(|D2−D1|/L1)*100%. Alternatively, this particular aspect of the present disclosure can be defined by the angle of the frustoconical shape's taper, $\alpha$. Stated differently, when viewed in vertical section as in FIGS. 5, 13, 15, and 16, a frustoconical engagement element can function to engage an opposed surface with edges and/or surfaces—along different elements of that element, including with sharp projections/edges/points as well as (or in the alternative) by other surfaces.

Figure 7:
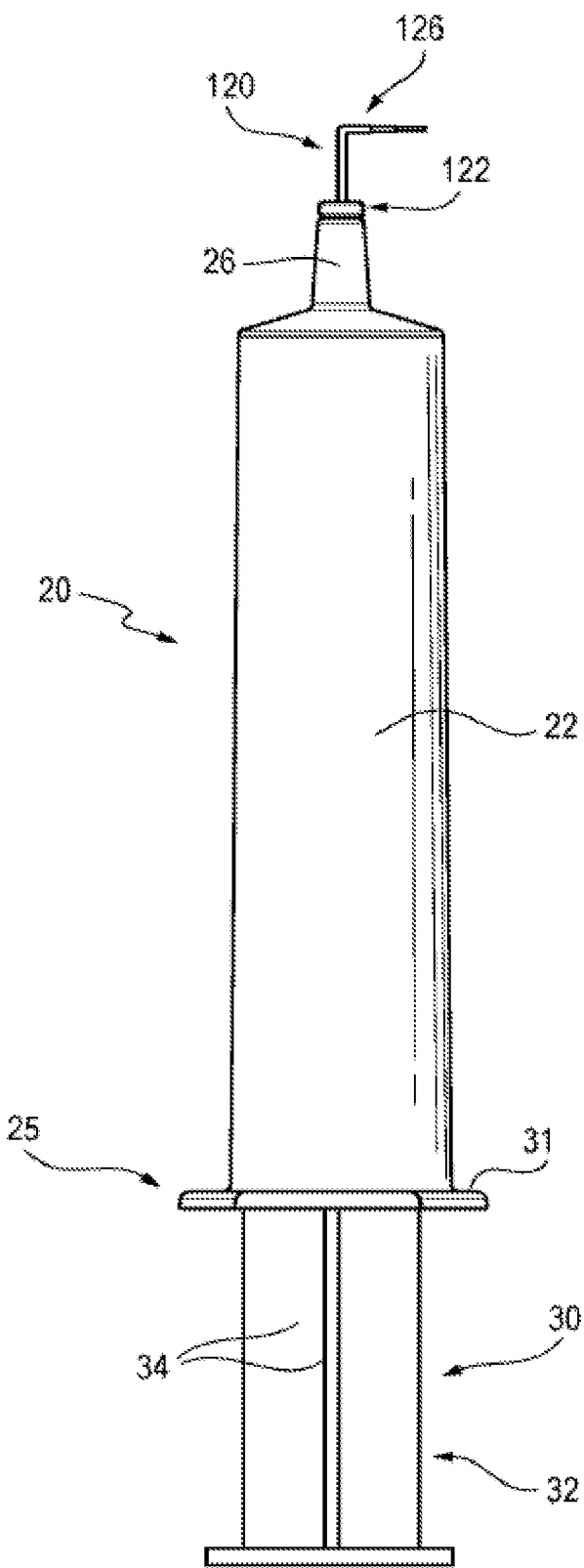
FIG. 7 is a side elevation view of an applicator secured to a syringe according to one exemplary and non-limiting embodiment.

The second section 168, which may optionally be omitted in some embodiments, is formed similarly to the first section 166 with a cylindrical portion 180 disposed against the first section 166 and a sloped portion 182 extending outwardly from the cylindrical portion 180. In the illustrated exemplary embodiment, the diameter of the cylindrical portion 180 corresponds to the diameter of the end 176 of the sloped portion 172, while the diameter of sloped portion 182 has a diameter larger than the cylindrical portion 180 at one end 184 immediately adjacent the cylindrical portion 180, which can be between 1.8 mm and 2.5 mm, and in one exemplary embodiment is 2.25 mm, and a diameter smaller than the cylindrical portion 180 at its opposite end 186, which can be between 1.6 mm to 2.0 mm, and in one exemplary embodiment is 1.8 mm. The end 184 having the larger diameter forms a barb 188 that can be compressed to frictionally and sealingly engage a surface against which the barb 188 is pressed to form a fluid-tight seal. The cylindrical portion 180 may vary in length depending on the surface against which the barb 188 is pressed, however, the length of the cylindrical portion 180 should be sufficient enough to allow proper mating of the tip 120 to a syringe 20 (FIG. 7). In certain embodiments, the cylindrical portion 180 is between 0.1 mm and 10 mm; in other embodiments the cylindrical portion 180 is between 0.25 mm and 5 mm, while in yet other embodiments the cylindrical portion 180 is between 0.4 mm and 1 mm, and in one exemplary embodiment the cylindrical portion 180 is 0.4 mm.

The first section 166 and second section 168 combine to form a passage 190 extending through the neck 140 that is in axial alignment and communicates with the passage 156 in the main body 138 to allow fluid or other materials to pass through the hub 122 formed by the main body 138 and the neck 140. The passage 190 can be can be formed as desired, such as with a smoothly tapering inner surface or, as in the exemplary illustrated embodiment with a number of successively narrowing concentric passage sections 192,194, or as a cylindrical passage with generally constant diameter.

Figure 8:
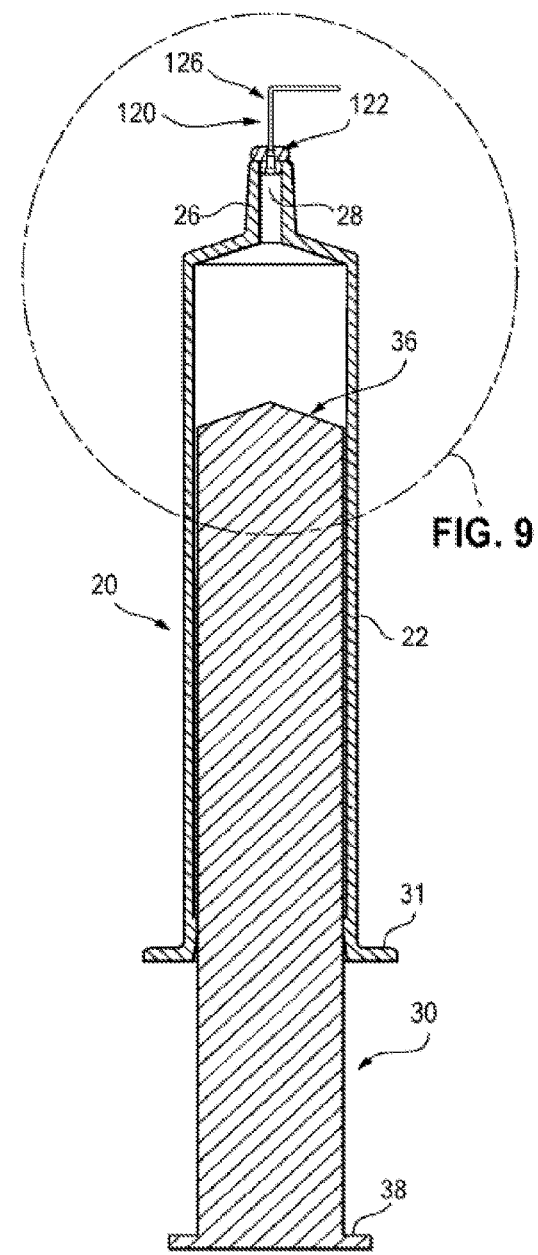
FIG. 8 is a cross-sectional view of the syringe and applicator of FIG. 7.
Figure 9:
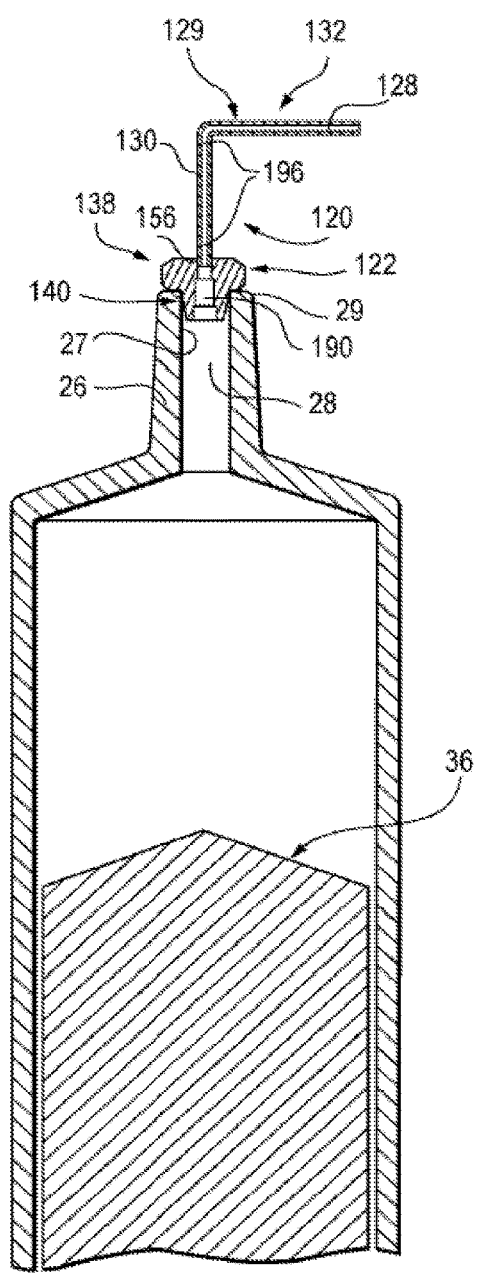
FIG. 9 is a detail view within arced line 9-9 of FIG. 8.
Figure 17:
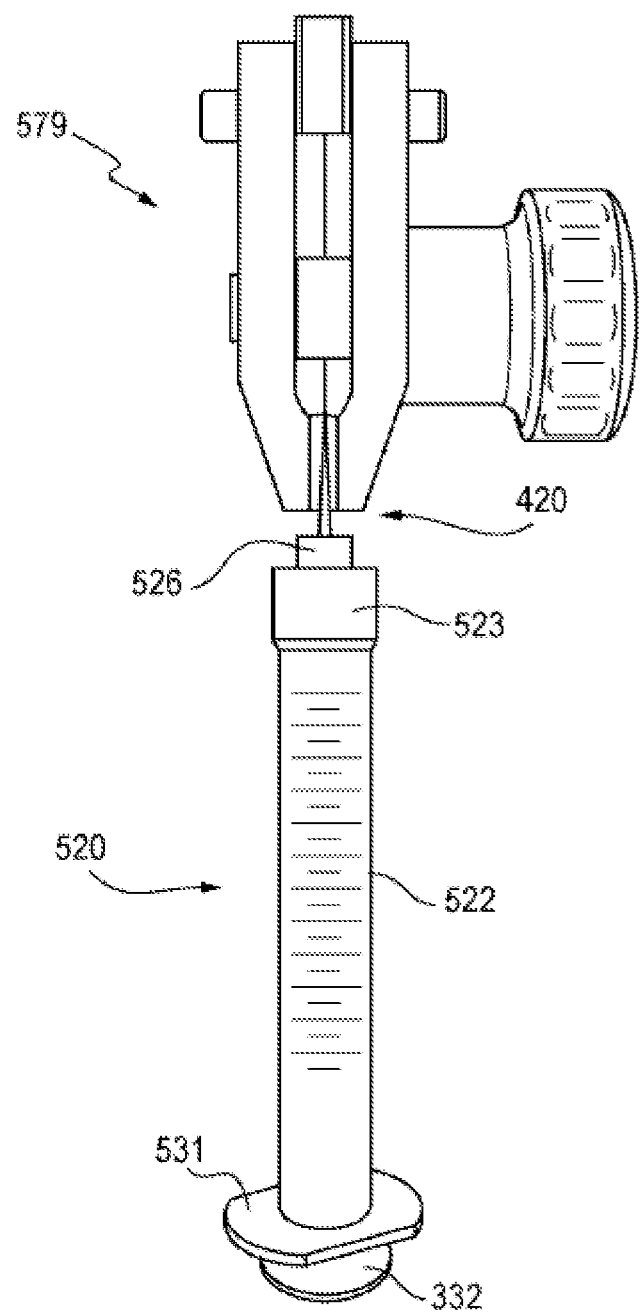
FIG. 17 illustrates the set-up of a pull force test with the embodiment of FIG. 16 and a syringe.

Looking now at FIGS. 7-9, in the illustrated exemplary and non-limiting embodiment, the applicator 120 is shown attached to a syringe 20. The syringe 20 has a barrel 22 that defines an interior volume for containing a fluid (not shown) that includes an open proximal end 25 and a distal nozzle 26 disposed at the opposite end of the barrel 22. The barrel 22 is formed of a suitable material, such as a plastic. The proximal end 25 includes an annular flange 31 used to grasp the barrel 22 in order to dispense the fluid contained within the barrel 22. The nozzle 26 opposite the proximal end 25 includes a tapered portion 27 that extends into a passage 28 extending there through that terminates at a dispensing end 29 out of which the fluid flows. Alternatively, the portion 27 can be straight and not tapered. In other syringe embodiments, such as the syringe 520 shown in FIG. 17, may include a distal luer structure well known in the art and illustrated here as a luer-equipped apron 523 that has an inward-facing luer structure, where a complementary outward facing structure may be (and indeed is) provided on certain applicator embodiments as described herein.

The syringe 20 also includes a plunger 30 that is inserted in the open end 25 of the barrel 22 within the annular flange 31. The plunger 30 includes a body 32 having a rigid structure formed of a suitable material, such as a plastic, with an outer diameter slightly less than that that of the interior 21 of the barrel 22. The body 32 is formed with mutually orthogonal ribs or splines 34 extending the length of the body 32. The body 32 supports a cap or bung 36 disposed within the barrel 22 that contacts and presses against the fluid within the barrel 22 to force the fluid or material through the nozzle 26 when the plunger 30 is pressed into the barrel 22.

Due to the construction of the neck 140 of the applicator 120, the neck 140 can be inserted or force fit directly into the passage 28 of the nozzle 26 to secure the applicator 120 to the syringe 20, with the main body 138 functioning as a stop against the dispensing end 29 to limit the distance the neck 140 can be inserted into the nozzle 26, as the main body 138 is formed with a diameter greater than the inner diameter of the nozzle 26. At least one of the barbs 178, 188 on the neck 140 engages and is compressed by and against the interior of the nozzle 26 to frictionally and sealingly engage the barbs 178,188 and the neck 140 within the nozzle 26, thereby preventing the discharge of any fluid from the syringe 20 other than through the applicator 120. The engagement of the barbs 178,188 with the nozzle 26 is sufficient to withstand the pressures exerted on the applicator 120 when the plunger 30 is used to dispense the fluid form the syringe 20. Further, as the neck 140 includes barbs 178,188 having two distinct diameters, the neck 140 can be engaged with nozzles 26 of various diameters, enabling the universal applicator 120 to be utilized with various types of syringes 20 without the need for specialized attachment caps or other unique structures. Therefore, in some embodiments, one barb or two barbs 178,188, or more barbs, may be incorporated to be used with various types of syringes 20.

In addition, the total volume of the space 196 defined by the passages 128,156,190 within the applicator 120 is minimized with this construction of the applicator 120, consequently minimizing the amount of fluid or material that will be retained within the applicator 120 after use. In testing the applicator 120 when dispensing BC sealer from a syringe 20 in a manner identically to that using in testing prior art applicators, the applicator 120 results in only 38 mg of material loss when dispensing the content of the syringe 20 in performing procedures using 35 mg of the BC sealer per procedure. Therefore, the presently-disclosed applicator 120 will yield approximately 27 procedures per syringe, even accounting for loss within applicators 120 for each procedure. As such, the structure of the applicator 120 results in a 54% reduction in the waste material generated from the syringe 20, and a 59% increase in the procedures that can be performed using the same amount of starting material over prior art applicator assemblages or hubs.

Other embodiments of the applicator 120 can include versions where the main body 138 can be reduced in size, with the tip 126 being directly secured to or formed on the lower surface 146 that extends across the neck 140, or where the main body 138 is omitted entirely and the tip 126 is secured or formed directly as part of the neck 140. Alternatively, another embodiment of the applicator 120 can include versions where the main body 138 is increased in size to facilitate easier handling and manipulation, but the passages 128,156,190 maintain their volume. In addition, as opposed to being formed from sloping surfaces, the barbs 178,188 can be formed with other configurations, such as circumferential ribs, ridges or protrusions (not shown) having the selected diameters, or other similar and suitable structures.

With reference to FIG. 12 and other embodiments, the taper percent (defined as the difference in diameter of the circles that define ends of a frustoconical element, divided by the length between the circles that comprise the frustoconical element) of the at least one frustoconical-shaped portion may be 20% to 180% in some embodiments, 25% to 120% in other embodiments, 30% to 80% in still other embodiment, and 40%-60% in certain embodiments. As noted above, FIG. 12 which diagrammatically depicts a frustoconical shape containing a circle of smaller diameter D1, a circle of larger diameter D2, and an axially longitudinal length, L1, between the circles that define end boundaries of the frustoconical shape. As such the angle of the frustoconical shape's taper (a) may be embodied as 30° to 85°, 40° to 80°, 60° and 80°, and in certain embodiments, 65° to 75°. Additionally, for non-limiting examples of embodiments including those configured to engage with a standard syringe having a luer-equipped apron around the distal syringe nozzle, the max diameter of the larger circle, D2, comprising one end of a frustoconical shape (on its own as one of a plurality) may be 2.0 mm to 4.2 mm, 2.8 mm to 4.0 mm, or in some embodiments, 3.0 mm to 3.2 mm. In such embodiments these specifications result in an engagement length between the at least one frustoconical element 278 of the applicator tip and the syringe nozzle's inner diameter of 0.5 mm to 15.0 mm, 1.0 mm to 7.0 mm, and in some embodiments, 1.5 mm to 6.0 mm. As such, in embodiments with these dimensions, an engagement length between and along the applicator's luer lock threads and the syringe's luer lock threads may be 1.0 mm to 15.0 mm, or in the range of 2.5 mm-9.0 mm. The length, L1, of the at least one frustoconical shaped portion of certain embodiments will be in the range of 0.5 mm to 15.0 mm, in other embodiment in the range of 1.0 mm-7.0 mm, and in the range of 1.5 mm to 6.0 mm in other embodiments. Additionally, the length of the hub portion of the applicator tip is may be in the range of 2.5 mm to 12.0 mm in some embodiments, 4.5 mm to 7.0 mm in some embodiments, and 1.5 mm 6.0 mm in some embodiments. Lastly, the applicator tip's hub portion, including the at least one frustoconical shape, may be constructed of an injection moldable plastic resin that exhibits flexing characteristics to facilitate a better friction fit between the at least one frustoconical shape 278 and the syringe's nozzle. Examples of suitable plastic resins include polyethylene, polypropylene, nylon, polyamides, acrylonitrile butadiene styrene, polylactic acid, polystyrene, and/or polytetrafluoroethylene, amongst others. The plastic resin may optionally include pigments, dyes, or other light attenuating compounds which may be useful if the applicator tip is used for dispensing light sensitive materials, such as dental composites, adhesives, cements, and/or epoxies, amongst others.

Another embodiment is described with reference to FIG. 13, which shows a longitudinal cross-section view of an applicator tip 220. The applicator tip 220 includes a hub 222 and applicator end 226. The hub 222 includes a body 238 with luer lock threads 239 configured to engage in a syringe's luer-equipped apron, wings to facilitate user grip for mating of the tip to a syringe (wings not shown in FIG. 13, because they are perpendicular to the illustrated cross-sectional plane, but may be understood with reference to commonly-known structures including in sample #1 of FIG. 14), and a frustoconical engagement structure 278. The luer threads 239 of the hub 222 are configured to engage with the inward-facing luer structure of a luer-equipped apron 523 around the nozzle 526 of a syringe. Specifically, the frustoconical engagement structure 278 is in a non-limiting, but illustrative manner, depicted as including two circles of 1.1 mm and 3.2 mm diameters, which circles are separated by a distance of 3.7 mm, so as to yield a taper angle ($\alpha$) of 74°. The applicator end includes stainless steel tubing 257 and polyimide tubing 259 (joined to each other via an adhesive). The applicator end 220 may be joined with the hub using an adhesive, epoxy, weld, or other commonly used joining material/technique. As shown, a fluid communication pathway 256 is configured through the length of the applicator tip 220 so that that material from a connected syringe can be expelled through the hub 222 to the distal terminal end of the applicator end 226. In one example of such a embodiment, the frustoconical shape is includes end circles of 1.1 mm and 3.2 mm diameter, which are separated by a distance of 3.7 mm, thereby yielding a taper angle, $\alpha$, of 74°. In the example embodiment, the applicator end includes stainless steel tubing 257 and polyimide tubing 259. A fluid communication pathway exists such that material from a connected syringe can be expelled through hub to the end of the applicator tip. This configuration will particularly be appreciated to minimize void space that is going to hold material in a non-deliverable position and thereby lessen or minimize waste of that material by the combination of its frustoconical barb interface with a syringe nozzle and very-small diameter applicator end. Potential embodiments including inward-facing and outward structural features may further be appreciated with reference to U.S. application Ser. No. 29/692,825 (incorporated herein by reference), although the proportions and overall ornamental appearance of those embodiments, which include particular configurations of lugs, wings, threads, and hub body geometries, are not dictated by the structural and functional limitations described and illustrated in the present disclosure.

It will be appreciated that the term "barb" used herein to describe engagement structure of the hub of various embodiments is not limited to a frustoconical shape. Additional designs within the scope of the present disclosure include the use of frustopyramidal shapes can be used instead of frustoconical shapes. To illustrate this in further detail, it is known that a horizontal cross section of the frustoconical shape yields a circle, whereas a horizontal cross section of the frustopyramidal shape yields a square or other rectilinear shape. Furthermore other designs may include a different frusto-polygonal shape, where a horizontal cross section of the frusto-polygon shape is defined to yields a polygon having the number of sides and angles of the three-dimensional frusto-polygonal structure. Additionally, the internal wall or bore (e.g., 156, 256, etc.) of the applicator tip's hub can be straight-cylindrical or tapered. Furthermore, for example, an external 6% taper may be advantageous to facilitate a tighter friction fit with standard 6% luer taper syringes. The disclosed fluid path can be straight, tapered, stepped, or various other geometries commonly utilized in injection molding. The applicator tip can all be comprised of one material or the applicator tip can be composed of at least two different materials. For example, the hub, including the at least one frustoconical shapes, can be injection molded from a suitable resin, while the applicator end might comprise a stainless steel cannula and may further comprise another material such as a polymer tube. As one such example, the hub can be injection molded from a suitable resin, while the applicator end might comprise a stainless steel cannula mated with a polyimide tube. Instead of stainless steel and polyimide, other metal and polymeric/plastic materials can be used (e.g. aluminum, steel, brass, titanium, polyethylene (PE), polypropylene (PP), acrylonitrile butadiene styrene (ABS), polyvinyl chloride (PVC), polytetrafluoroethylene (PTFE), amongst others). Instead of luer lock threads, standard tip lugs or any other functional structure can be utilized to engage the syringe luer lock threads.

Figure 4:
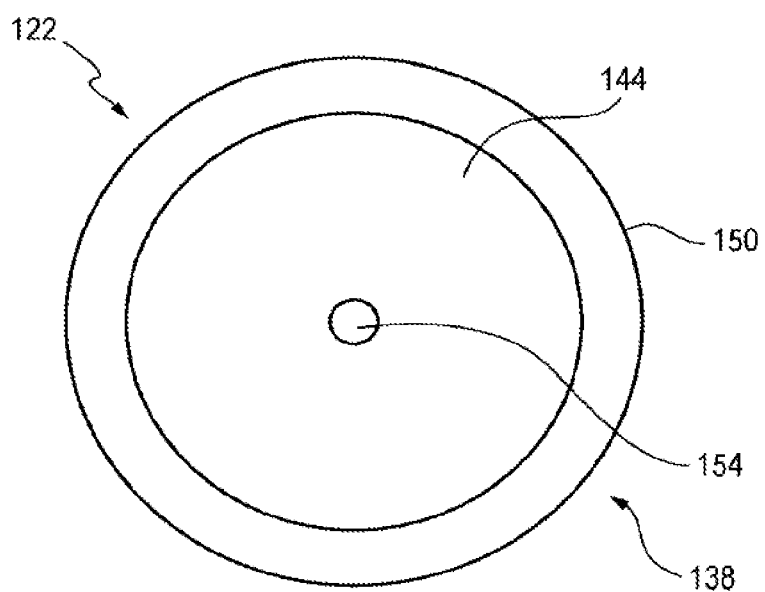
FIG. 4 is top plan view of the hub of FIG. 3.
Figure 5:
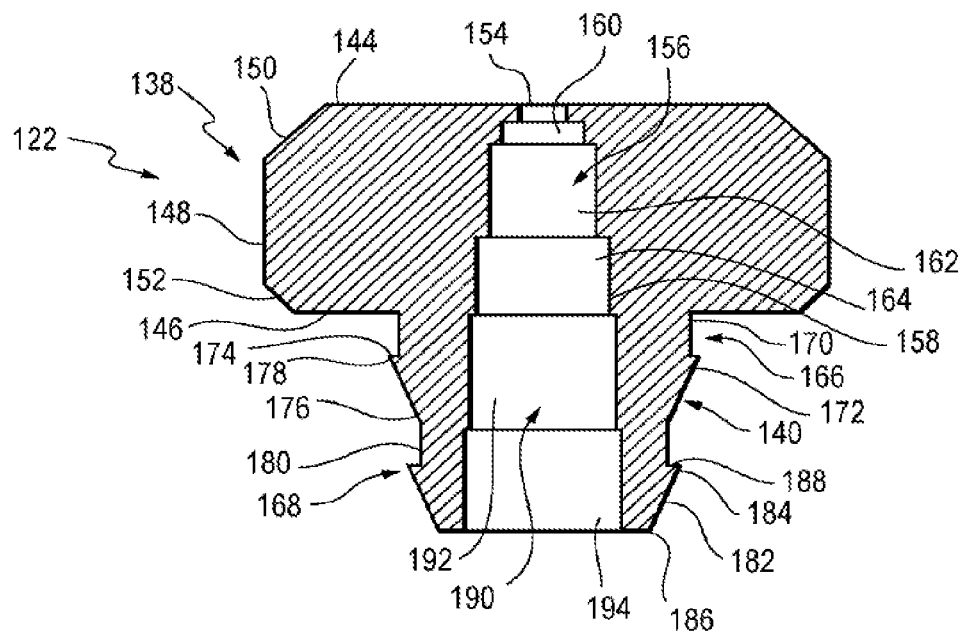
FIG. 5 is cross-sectional view along line 5-5 of FIG. 3.
Figure 6:
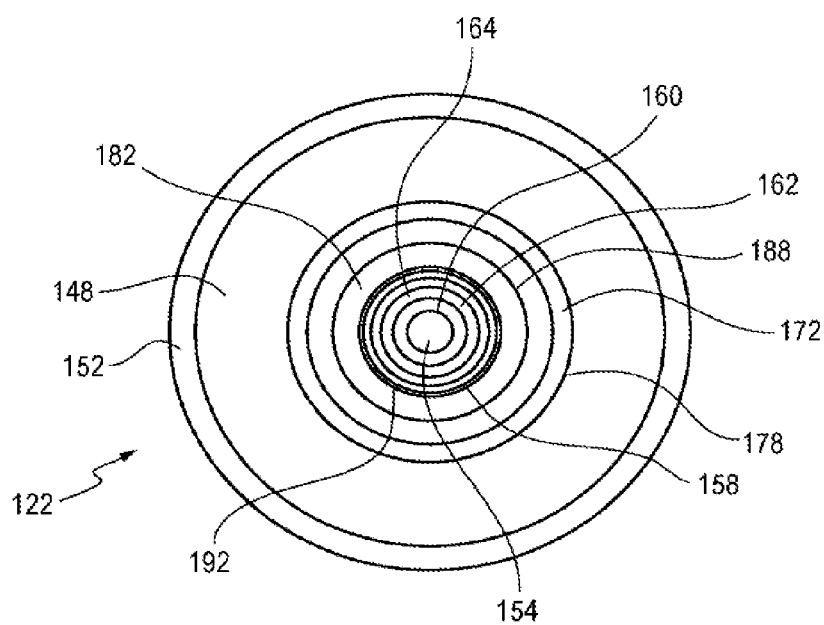
FIG. 6 is a bottom plan view of the hub of FIG. 3.
Figure 13:
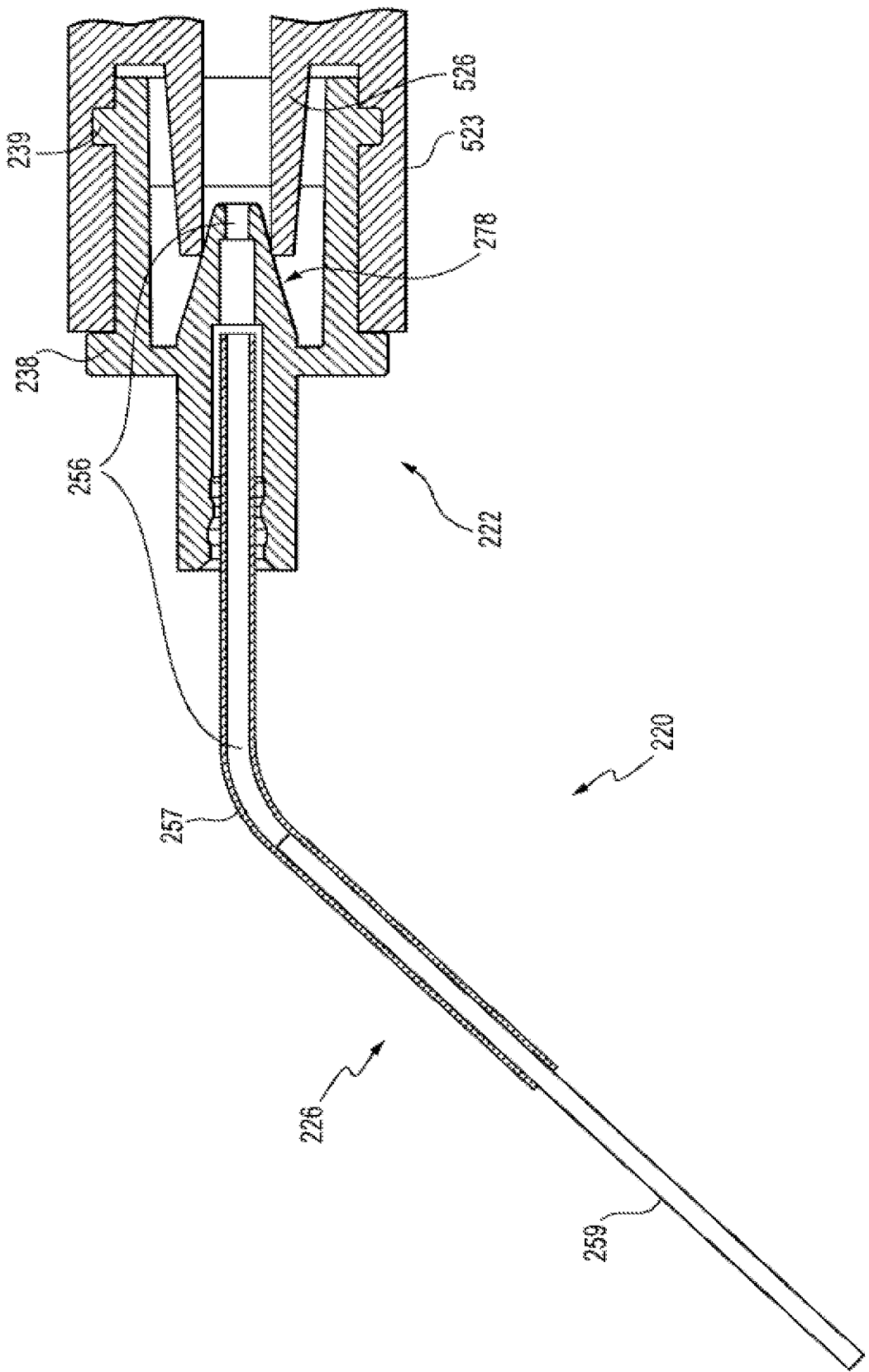
FIG. 13 shows a lengthwise cross-section of another embodiment of an applicator tip.
Figure 14:
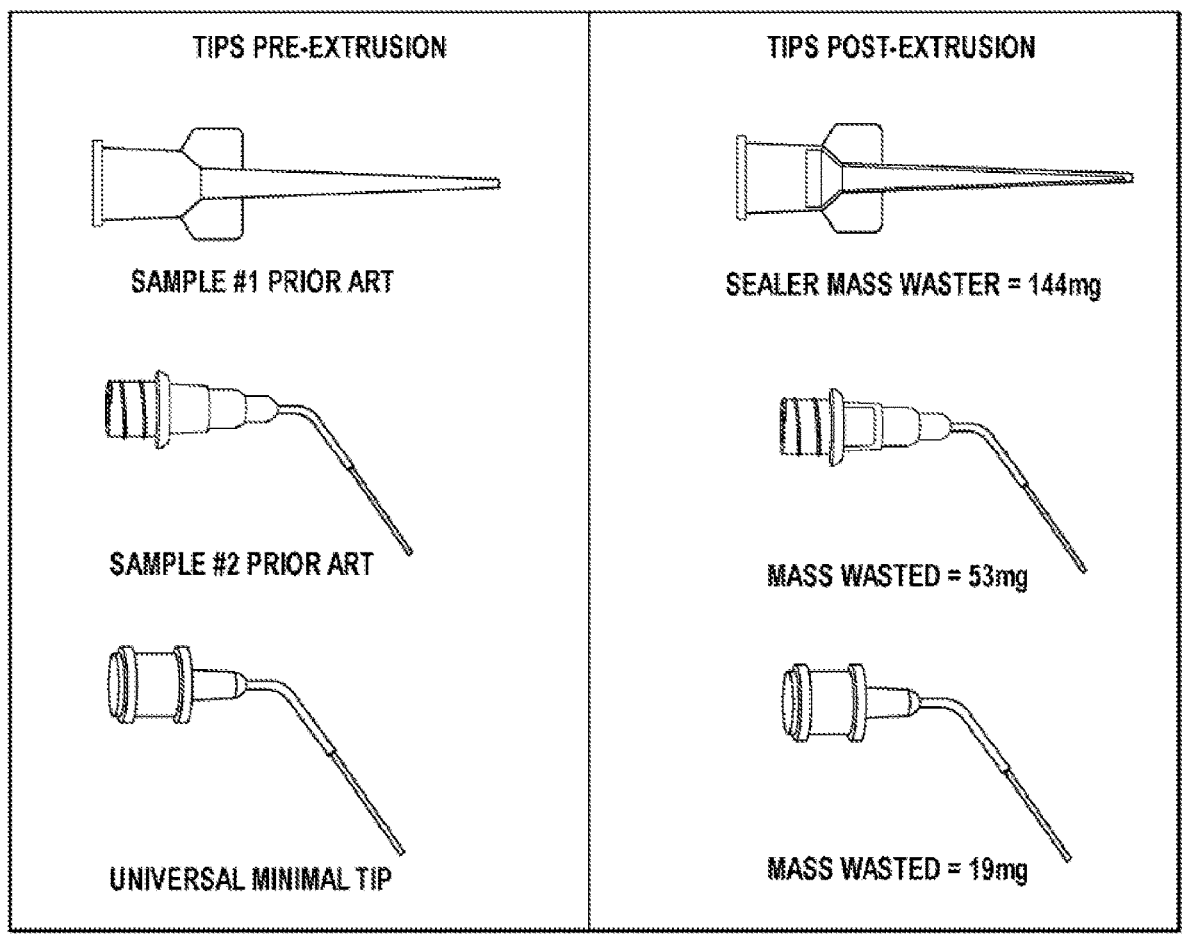
FIG. 14 visually contrasts two different prior art tips versus the tip of FIG. 13 with views showing before and after extrusion of material through each, diagrammatically portraying actual samples.

Referring next to FIG. 14, an experimental contrast is illustrated between current/prior art tips as compared to the tip 220 of FIG. 13 (which is informative also with reference to other embodiments of the present disclosure). The left-hand column of FIG. 4 shows "SAMPLE 1" (a BC tip from Brasseler of Savannah, Ga.), "SAMPLE 2" (ViscoTip from Vista Dental Products of Racine, Wis.), and "SAMPLE 3," which is constructed in keeping with the FIG. 13 embodiment of a universal minimal waste tip disclosed herein. The mass of each tip was measured pre and post-extrusion of BC Sealer (from Brasseler of Savannah, Ga.) using an analytical balance (from Sartorius of Goettingen, Germany) to calculate the amount of material remaining within each tip after a delivery syringe was fully discharged through the tip. The right column of FIG. 4 shows the tips following extrusion of the sealer, and the mass of material remaining within each tip; the mass of material remaining within each tip is also illustrated in TABLE 1 below. Sample 1, Sample 2, and Sample 3 had 144 mg, 53 mg, and 19 mg, respectively, of material left within each tip after use, which would be considered waste. Compared to Sample 1 and Sample 2, Sample 3 (presently-disclosed universal minimal-waste tip) yields a material savings of 86.8%, and 64.2%, respectively. Depending on the material and/or the type of applicator tip used, it might be advantageous to save various amounts of material. Therefore, the present inventive tip resulted in significantly less material wasted compared to existing tips on the market. In a preferred embodiment, the Universal Minimal Waste Tip will yield a material savings of at least 20% compared to a standard applicator tip. In a more preferred embodiment, the Universal Minimal Waste Tip will yield a material savings of at least 40% compared to a standard applicator tip. In an even more preferred embodiment, the Universal Minimal Waste Tip will yield a material savings of at least 75% compared to a standard applicator tip, where standard applicator tip refers to the known/commercially-available products as of the time of this disclosure.

Figure 3:
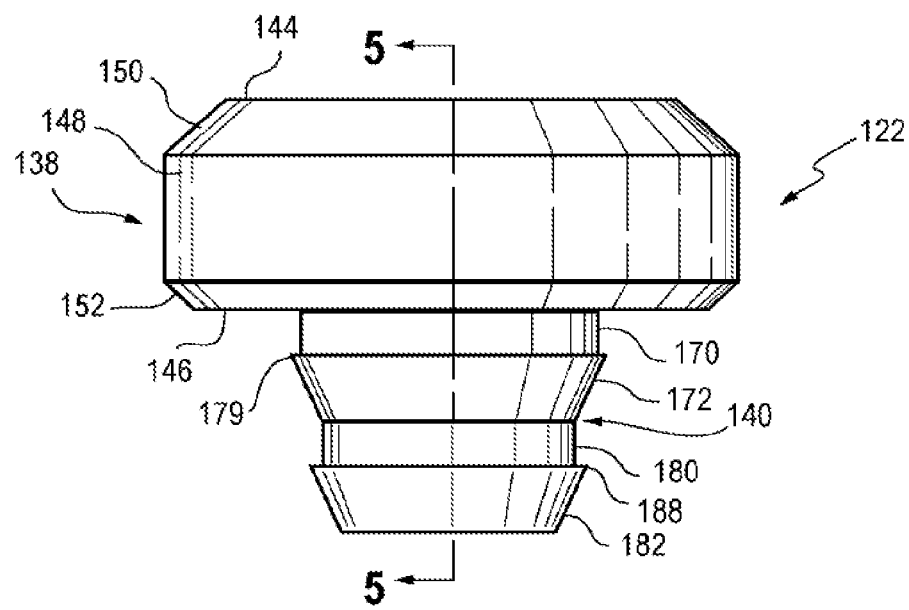
FIG. 3 is side elevation view of a hub of an applicator hub element according to one exemplary and non-limiting embodiment.

A similar comparative experiment to calculate the materials savings using an embodiment of the present disclosure was performed utilizing Embrace Pit & Fissure Sealant (from Pulpdent of Watertown, Mass.) and TheraCal (from Bisco of Schaumburg, Ill.). Both these dental products are commercialized with a 22 ga pre-bent applicator tip. The specific embodiment of the universal minimal waste tip utilized in this experiment was the embodiment as shown in FIG. 3, however, the applicator end was only a 22 ga pre-bent stainless steel cannula which was the same dimensions as those two comparison products. As such, all material savings disclosed were solely due to the presently-disclosed applicator tip's hub design and not due to variations in cannula size and/or length. Nevertheless, the mass of each applicator tip was measured pre- and post-material extrusion to calculate the residual material left within each applicator tip. Results are summarized in TABLE 1. Compared to the standard 22 ga pre-bent tips, the 22 ga universal minimal waste tips (UMWT) saved 42.8% and 81.4% material as compared, respectively to the Embrace Pit & Fissure Sealant and to TheraCal.

TABLE 1

Material savings of various dental materials utilizing various embodiments of the disclosed universal minimal waste tip (UMWT)

| Application Tip | Material | Mass Wasted (mg) | Material Savings Using UMWT |
|---|---|---|---|
| BC Tip | BC Sealer | 143.9 | 86.8% |
| ViscoTip | BC Sealer | 53.0 | 64.2% |
| ViscoTip UMWT | BC Sealer | 19.0 | — |
| 22ga Pre-Bent Tip | Embrace Pit & Fissure Sealant | 57.4 | 74.6% |
| 22ga UMWT | Embrace Pit & Fissure Sealant | 14.6 | — |
| 22ga Pre-Bent Tip | TheraCal | 93.4 | 81.4% |
| 22ga UMWT | TheraCal | 17.4 | — |

Figure 15:
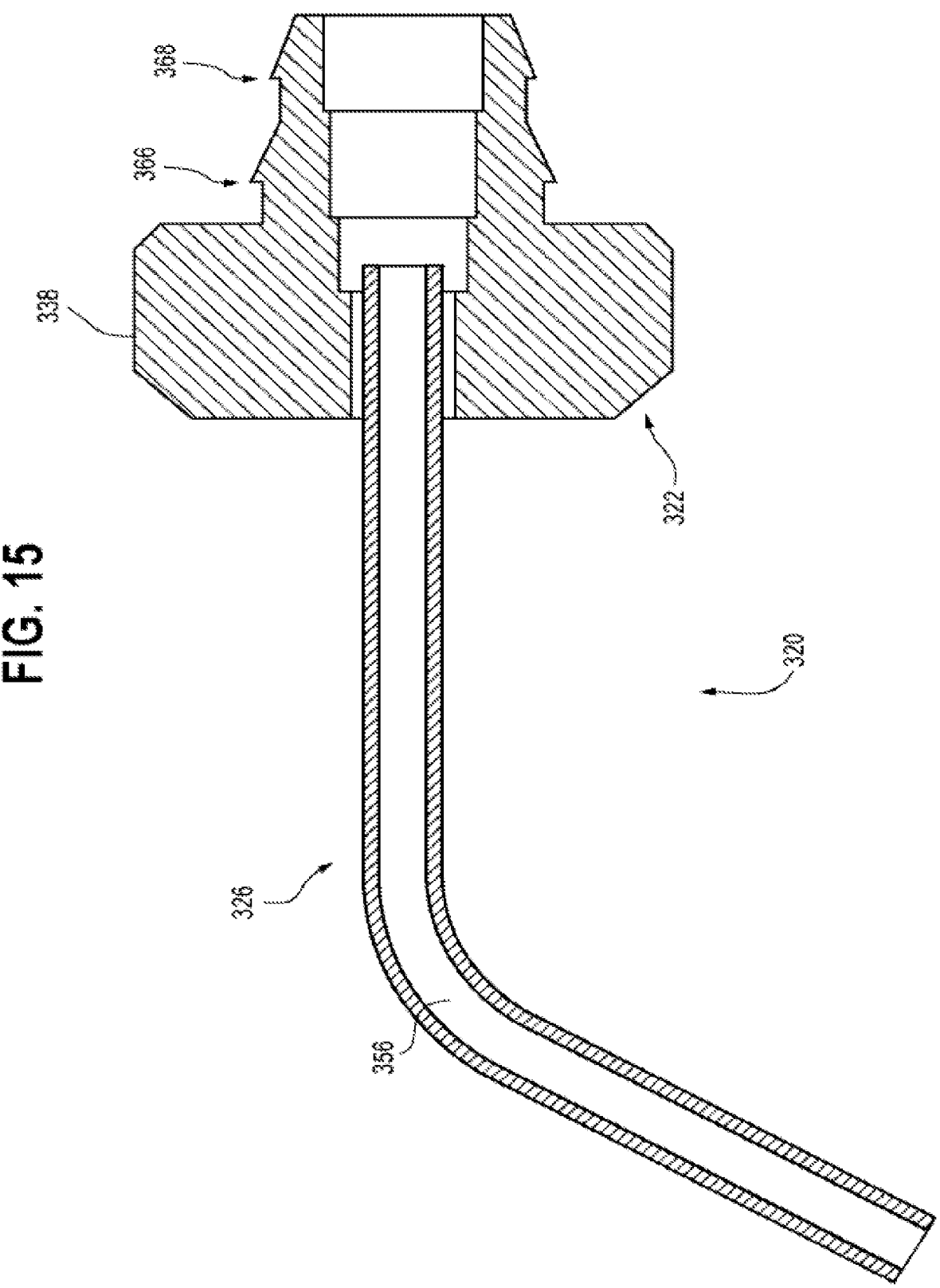
FIG. 15 shows a lengthwise cross-section of another embodiment of an applicator tip, similar to the embodiment of FIGS. 2-9.

With respect to another embodiment, FIG. 15 shows a cross-section example of an applicator tip 320, which is similar to that of FIGS. 2-9, except that the cannula end portion 326 has a different shape. The applicator tip 320 is comprised of a hub 322 and applicator end 326. The hub 322 includes a body 338 and two barbs 366, 368 each of which is constructed as a frustoconical shape directly adjacent to a cylinder of reduced diameter (as compared to the largest circle comprising the frustoconical shape) projecting from the body 338. Specifically, barb 368 includes a frustoconical shape, with two circles of 1.8 mm and 2.25 mm diameters separated by a longitudinal distance of 0.6 mm, which yields a taper angle of 69°. Directly adjacent to the frustoconical portion of barb 368 and separating it from barb 366 is a cylinder of diameter 2.1 mm and length 0.4 mm. Together, the frustoconical element and adjacent cylinder comprise barb 368. Barb 366 includes a frustoconical shape, with two circles of 2.1 mm and 2.6 mm diameters, separated by a longitudinal distance of 0.6 mm, which yields a taper angle of 67°. Directly adjacent to the frustoconical portion of barb 368 and separating it from hub body 338 is a cylinder of diameter 2.45 mm and length 0.4 mm. Together, the frustoconical element and adjacent cylinder comprise barb 366. The applicator end 326 includes a stainless steel tube. A fluid communication pathway 356 extends through the tip 320 such that material from a connected syringe can be expelled through the hub to the end of the applicator tip. The barbs 366, 368 are configured to be received securely into the lumen/passage through the distal nozzle of a syringe, with said secure attachment being sufficiently strong to reliably resist displacement during delivery of material through the tip 320, while still providing an ability to be removed while leaving the syringe in condition to have another tip attached thereto.

Figure 16:
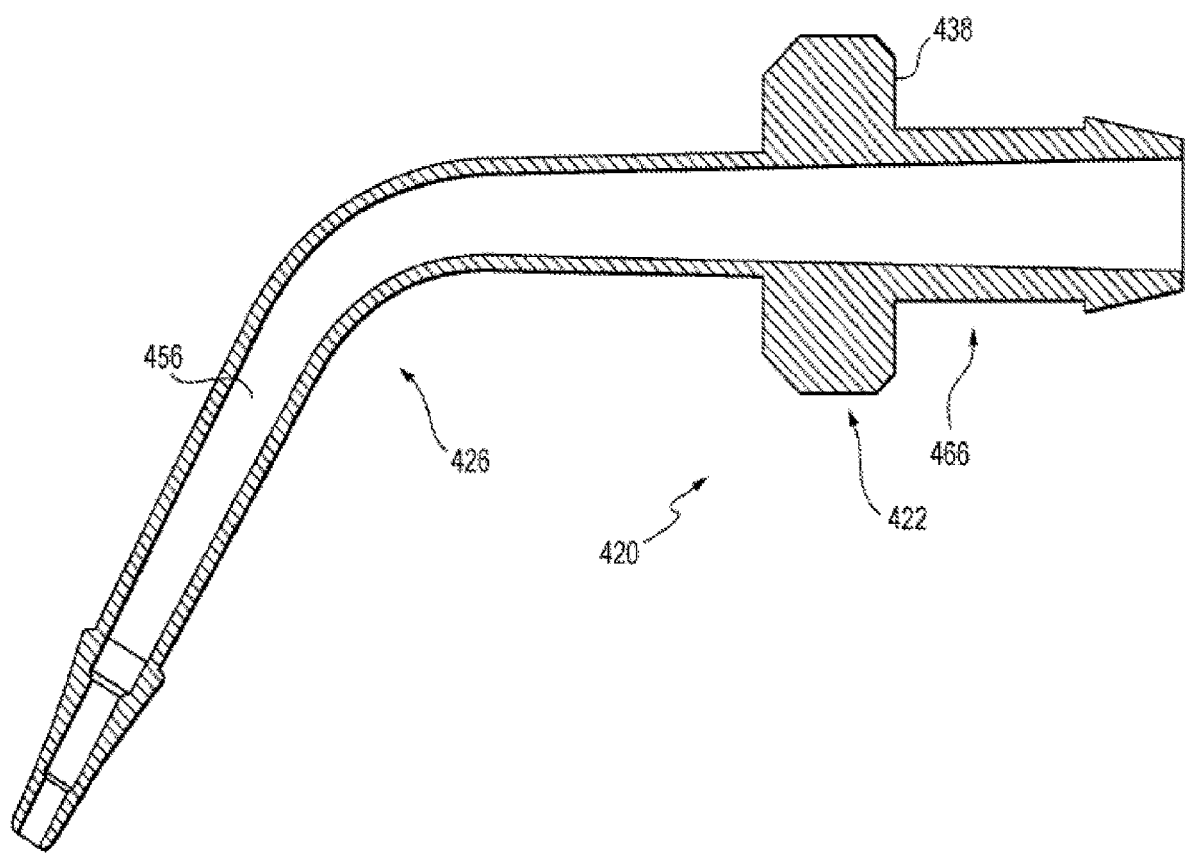
FIG. 16 shows a lengthwise cross-section of still another embodiment of an applicator tip, similar in many respects to the embodiment of FIGS. 2-9.

In another embodiment, FIG. 16 shows a longitudinal cross-section view of an applicator tip 420. The applicator tip 420 includes a hub 422 and applicator end 426 that is injection molded as a single piece from a plastic resin, similar to the embodiment of FIG. 10. In one method of production, the applicator tip 420 is injection-molded straight, and then bent via post-process heat bending to a desired angle or curve. The hub 422 includes a body 438 and one barb 466 which includes a frustoconical shape separated from the body 438 by a cylinder of reduced diameter compared to the largest circle comprising the frustoconical shape. In one sample embodiment, the barb is comprised of a frustoconical shape which is made from two circles of 2.06 mm and 2.54 mm diameters separated by a distance of 1.4 mm, which yields a taper angle of 80°. As shown, a fluid communication pathway 456 is configured such that material from a connected syringe can be expelled through the length of the applicator tip.

As a means of testing, the applicator tip 420 shown in FIG. 16 was mated to multiple conventional syringes of varying internal nozzle diameters. This assembly was then subjected to a pull test to determine the amount of force required to separate the applicator tip from the mated syringe (this is defined as the fitment force), where the testing set-up is shown and described with reference to FIG. 17. Because this applicator tip design does not incorporate luer lock threads, the only mechanism mating the applicator tip to the syringe is the friction force between the applicator tip's frustoconical shape and the inner diameter of the syringe nozzle. Each syringe was tested in at least triplicate with new applicator tips used for each trial, using the testing set-up shown in FIG. 17, which includes a syringe 520 with a plunger 532, proximal flange 531, barrel 522, and apron 523 with inward facing luer disposed around the syringe nozzle (not shown, but readily understandable from FIGS. 7-9). For each test of three or more "pulls," a syringe 520 was provided, each tested applicator tip 420 had its hub 422 inserted into the syringe nozzle until the nozzle's distal terminus contacted or nearly contacted the hub body 438. Then, a force gauge 579 was attached to the applicator tip 420 and used to test the removal force for each applicator 420 by a "pull" separating the tip from the syringe.

Results of the tests are summarized below in TABLE 2 and illustrate a direct relationship between the barb overlap metric (defined as subtracting the syringe nozzle inner diameter from D2 of the device and as illustrated in FIG. 12)

and the average pull force required to separate the syringe and applicator tip. In other words, the greater the overlap between the frustoconical shape's largest diameter, D2, and the syringe nozzle's inner diameter, the better the friction fit between the applicator tip and syringe, which means greater force will be required to separate the two parts. The fitment force between the disclosed applicator tip and syringe is preferably equal to or greater than 5N, more preferably equal to or greater than 10N, even more preferably equal to or greater than 15N, and most equal to or preferably greater than 20N.

TABLE 2

The applicator tip disclosed in FIG. 16 was mated with multiple syringes of varying internal nozzle diameters. A pull test was performed to determine the amount of force required to separate the applicator tip from the syringe. ID = inner diameter.

| Syringe Nozzle ID (mm) | Barb Overlap (mm)* | No. of Trials | Force Needed to Separate Tip and Syringe/ Fitment Force (N) | |
|---|---|---|---|---|
| | | | AVE | SD |
| 2.12 | 0.42 | 3 | 17.6 | 0.8 |
| 2.18 | 0.36 | 5 | 15.7 | 0.5 |
| 2.24 | 0.30 | 5 | 12.1 | 1.1 |
| 2.50 | 0.04 | 5 | 5.8 | 0.0 |

*In this particular embodiment, the max diameter of the frustoconical shape, D2, is 2.54 mm. Therefore, the "barb overlap" was calculated by subtracting the syringe nozzle ID from the 2.54 mm value.

Those of skill in the art will appreciate that embodiments not expressly illustrated herein may be practiced within the scope of the claims, including that features described herein for different embodiments may be combined with each other and/or with currently-known or future-developed technologies while remaining within the scope of the claims. Although specific terms are employed herein, they are used in a generic and descriptive sense only and not for purposes of limitation unless specifically defined by context, usage, or other explicit designation. It is therefore intended that the foregoing detailed description be regarded as illustrative rather than limiting. And, it should be understood that the following claims, including all equivalents, are intended to define the spirit and scope of this invention. Furthermore, the advantages described above are not necessarily the only advantages of the invention, and it is not necessarily expected that all of the described advantages will be achieved with every embodiment. In the event of any inconsistent disclosure or definition from the present application conflicting with any document incorporated by reference, the disclosure or definition herein shall be deemed to prevail unless expressly stated otherwise.

We claim:

1. An applicator configured to be secured to a syringe for directing materials to be dispensed from the syringe, the applicator comprising:

a hub defining a fluid passage therethrough, wherein the hub comprises a lower surface and an upper surface, the upper surface includes an aperture that communicates with the fluid passage, the fluid passage containing at least two successively different concentric passage sections of differing diameters, and including at least one proximal frustoconical-shape feature, the at least one proximal frustoconical-shape feature configured to be inserted into an interior wall of a syringe nozzle and frictionally engage the interior wall of the syringe nozzle, wherein an engaged length between the at least one proximal frustoconical-shape feature and the interior wall of the syringe nozzle is between 1 mm and 10 mm, and an applicator tip extending distally from the aperture of the hub.

2. The applicator of claim 1, wherein the at least one proximal frustoconical-shape feature has a taper percentage between 40° and 80°.

3. The applicator of claim 1, wherein the at least one proximal frustoconical-shape feature has a taper percentage between 65° and 80°.

4. The applicator of claim 1, wherein the hub is formed from a compressible material capable of forming a fluid tight seal with the interior wall of the syringe nozzle once frictionally engaged with the interior wall of the syringe nozzle.

5. The applicator of claim 1, wherein the hub is injection molded from one of the following materials: polyethylene, polypropylene, nylon, polyamide, acrylonitrile butadiene styrene, polylactic acid, polystyrene, polytetrafluoroethylene.

6. The applicator of claim 1, wherein the applicator tip is formed separately and secured to the hub, or wherein the applicator tip is integrally formed with the hub.

7. The applicator of claim 1, where the applicator tip extending distally from the hub comprises at least two different materials.

8. The applicator of claim 1, wherein the applicator tip is comprised of at least one metal cannula.

9. The applicator of claim 1, wherein the applicator tip is comprised of at least one metal cannula and at least one non-metal material.

10. The applicator of claim 1, wherein the applicator tip is comprised of a metal cannula and a non-metal cannula.

11. The applicator of claim 1, wherein the applicator tip includes a terminal structure opposite the hub selected from the group consisting of a brush, a pad, or flocked fibers.

12. The applicator of claim 1, wherein each of the at least one proximal frustoconical-shape features are between 3 mm and 10 mm in length.

13. A syringe assembly configured for dispensing a material, the syringe assembly comprising:

a barrel defining an open end and a distal nozzle opposite the open end;

a plunger disposed at least partially within the open end and including a bung sealingly engaged between the plunger and the barrel;

an applicator including a hub disposed at least partially within the nozzle and defining a fluid passage therethrough, the fluid passage containing at least two successively different concentric passage sections of differing diameters, and including at least one proximal frustoconical-shape feature, the at least one proximal frustoconical-shape feature configured to be inserted into an interior wall of a syringe nozzle and frictionally engage the interior wall of the syringe nozzle, wherein, an engaged length between the at least one proximal frustoconical-shape feature and the interior wall of the syringe nozzle is between 1 mm and 10 mm, and an applicator tip extending outwardly from an aperture of the hub;

dispensing the material located in the barrel;

wherein the hub includes a neck inserted within the syringe nozzle, the neck extending outwardly from a lower surface of the hub and wherein at least one barb is disposed on the neck.

14. The syringe assembly of claim 13, wherein the at least one proximal frustoconical-shape feature has a taper percentage between 40° and 80°.

15. The syringe assembly of claim 13, wherein the hub is formed from a compressible material capable of forming a fluid tight seal with the interior wall of the syringe nozzle once frictionally engaged with the interior wall of the syringe nozzle.

16. The syringe assembly of claim 13, wherein the hub is injection molded from one of the following materials: polyethylene, polypropylene, nylon, polyamide, acrylonitrile butadiene styrene, polylactic acid, polystyrene, polytetrafluoroethylene.

17. The syringe assembly of claim 13, where the applicator tip extending distally from the hub comprises at least two different materials.

18. The syringe assembly of claim 13, wherein the applicator tip is comprised of at least one metal cannula and at least one non-metal material.

19. The syringe assembly of claim 13, wherein the applicator tip includes a terminal structure opposite the hub selected from the group consisting of a brush, a pad, or flocked fibers.

20. The syringe assembly of claim 13, wherein each of the at least one proximal frustoconical-shape features are between 3 mm and 10 mm in length.

\* \* \* \* \*